United States Patent
Shazeer et al.

(10) Patent No.: US 11,392,790 B2
(45) Date of Patent: Jul. 19, 2022

(54) ATTENTION-BASED IMAGE GENERATION NEURAL NETWORKS

(71) Applicant: Google LLC, Mountain View, CA (US)

(72) Inventors: Noam M. Shazeer, Palo Alto, CA (US); Lukasz Mieczyslaw Kaiser, Mountain View, CA (US); Jakob D. Uszkoreit, Berlin (DE); Niki J. Parmar, Sunnyvale, CA (US); Ashish Teku Vaswani, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/098,271

(22) Filed: Nov. 13, 2020

(65) Prior Publication Data
US 2021/0064924 A1 Mar. 4, 2021

Related U.S. Application Data

(63) Continuation of application No. 16/174,074, filed on Oct. 29, 2018, now Pat. No. 10,839,259.
(Continued)

(51) Int. Cl.
*G06K 9/62* (2022.01)
*G06N 3/08* (2006.01)
(Continued)

(52) U.S. Cl.
CPC ......... *G06K 9/6255* (2013.01); *G06K 9/6232* (2013.01); *G06K 9/6262* (2013.01);
(Continued)

(58) Field of Classification Search
CPC .. G06K 9/6255; G06K 9/4652; G06K 9/6232; G06K 9/6262; G06N 3/04; G06N 3/084; G06T 3/4053
(Continued)

(56) References Cited

U.S. PATENT DOCUMENTS

| 2004/0239762 A1* | 12/2004 | Porikli | G06T 7/20 348/172 |
| 2018/0322366 A1* | 11/2018 | Lim | G06V 10/82 |

OTHER PUBLICATIONS

Ba et al. "Layer normalization," arXiv 1607.06450v1, Jul. 21, 2016, 14 pages.
(Continued)

*Primary Examiner* — Wednel Cadeau
(74) *Attorney, Agent, or Firm* — Fish & Richardson P.C.

(57) ABSTRACT

Methods, systems, and apparatus, including computer programs encoded on a computer storage medium, for generating an output image. In one aspect, one of the methods includes generating the output image intensity value by intensity value according to a generation order of pixel—color channel pairs from the output image, comprising, for each particular generation order position in the generation order: generating a current output image representation of a current output image, processing the current output image representation using a decoder neural network to generate a probability distribution over possible intensity values for the pixel—color channel pair at the particular generation order position, wherein the decoder neural network includes one or more local masked self-attention sub-layers; and selecting an intensity value for the pixel—color channel pair at the particular generation order position using the probability distribution.

22 Claims, 4 Drawing Sheets

Related U.S. Application Data

(60) Provisional application No. 62/578,390, filed on Oct. 27, 2017.

(51) Int. Cl.
*G06N 3/04* (2006.01)
*G06T 3/40* (2006.01)
*G06V 10/56* (2022.01)

(52) U.S. Cl.
CPC .............. *G06N 3/04* (2013.01); *G06N 3/084* (2013.01); *G06T 3/4053* (2013.01); *G06V 10/56* (2022.01)

(58) Field of Classification Search
USPC ........................................................ 382/158
See application file for complete search history.

(56) References Cited

OTHER PUBLICATIONS

Bellemare et al. "Unifying count-based exploration and intrinsic motivation," arXiv 1606.01868v2, Nov. 7, 2016, 20 pages.
Bengio et al. "Modeling high-dimensional discrete data with multilayer neural networks," NIPS, Dec. 2000, 7 pages.
Berthelot et al. "BEGAN: boundary equilibrium generative adversarial networks," arXiv 1703.10717v4, May 31, 2017, 10 pages.
Chen et al. "PixelSNAIL: An improved autoregressive generative model," arXiv 1712.09763, Dec. 28, 2017, 6 pages.
Cheng et al. "Long short-term memory-networks for machine reading," arXiv 1601.06733v7, Sep. 20, 2016, 11 pages.
Dahl et al. "Pixel recursive super resolution," arXiv 1702.00783v2, Mar. 22, 2017, 22 pages.
Goodfellow et al. "Generative adversarial nets," NIPS, Dec. 2014, 9 pages.
Kalchbrenner et al. "Recurrent continuous translation models," Proceedings EMNLP, Oct. 2013, 10 pages.
Kalchbrenner et al. "Video pixel networks," arXiv 1610.00527, Oct. 3, 2016, 16 pages.
Kingma et al. "Adam: A method for stochastic optimization," arXiv 1412.6980v9, Jan. 30, 2017, 15 pages.
Larochelle et al. "The neural autoregressive distribution estimator," Proceedings of the 14$^{th}$ International Conference on Artificial Intelligence and Statistics, vol. 15 of JMLR, Jun. 2011, 9 pages.
Ledig et al. "Photo-realistic single image super-resolution using a generative adversarial network," arXiv 1609.04802v5, May 25, 2017, 19 pages.
Mansimov et al. "Generating images from captions with attention," arXiv 1511.02793v2, Feb. 29, 2016, 12 pages.
Metz et al. "Unrolled generative adversarial networks," arXiv 1611.02163v4, May 12, 2017, 25 pages.
Parikh et al. "A decomposable attention model," arXiv 1606.01933v2, Sep. 25. 2016, 7 pages.
Radford et al. "Unsupervised representation learning with deep convolutional generative adversarial networks," arXiv 1511.06434v2, Jan. 7, 2016, 16 pages.
Salimans et al. "PixelCNN++: Improving the PixelCNN with discretized logistic mixture likelihood and other modifications," arXiv1701.05517, Jan. 19, 2017, 10 pages.
Srivastava et al. "Dropout: a simple way to prevent neural networks from overfitting," Journal of Machine Learning Research, 15(1), Jan. 2014, 30 pages.
Theis et al. "Generative image modeling using spatial lastms," Proceedings of the 28$^{th}$ International Conference on Neural Information Processing Systems, Dec. 2015, 9 pages.
Van den Oord et al. "The student-t mixture as a natural image patch prior with application to image compression," Journal of Machine Learning Research, Jan. 2014, 26 pages.
Van den Oord et al. "Pixel recurrent neural networks," arXiv 1601.06759v3, Aug. 19, 2016, 11 pages.
Van den Oord et al. "Conditional image generation with pixelcnn decoders," NIPS, Dec. 2016, 9 pages.
Vaswani et al. "Attention is all you need," arXiv 1706.03762v5, Dec. 6, 2017, 15 pages.
Vaswani et al. "Tensor2tensor for neural machine translation," arXiv 1803.07416, Mar. 16, 2018, 9 pages.
Zhang et al. "StackGan: Text to photo-realistic image synthesis with stacked generative adversarial networks," arXiv 1612.03242v2, Aug. 5, 2017, 14 pages.

\* cited by examiner

ATTENTION-BASED IMAGE GENERATION NEURAL NETWORKS

CROSS-REFERENCE TO RELATED APPLICATIONS

This is a continuation of U.S. application Ser. No. 16/174,074, filed on Oct. 29, 2018, which claims priority to U.S. Provisional Application No. 62/578,390, filed on Oct. 27, 2017. The disclosures of the prior applications are considered part of and are incorporated by reference in the disclosure of this application.

BACKGROUND

This specification relates to generating images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that generates an output image. In particular, the system generates the output image using a decoder neural network that is attention-based.

Particular embodiments of the subject matter described in this specification can be implemented so as to realize one or more of the following advantages.

Attention-based neural networks have been shown to perform well on sequence processing tasks, e.g., tasks that involve processing a sequential input, autoregressively generating a sequential output, or both. However, for each position in a given output or input sequence, self-attention layers in an attention-based neural network attend over (at least) all of the preceding positions in the sequence. This makes attention-based neural networks difficult to apply to tasks that require generating an output image. While an image can be represented as a sequence of color values, images are composed of a large number of color values. For example, a 32×32×3 (RGB) image has over 3,000 color values, resulting in a very long sequence representation. Additionally, images have a two-dimensional (and, for color images, three-dimensional) structure that is difficult to represent as a one-dimensional sequence.

The described techniques allow images to effectively be generated by an attention-based neural network by (i) effectively representing the images that are processed by the neural network and (ii) modifying the self-attention scheme applied the self-attention layers in the neural network. Because of this, the neural network used to generate the image generates high-quality images and is computationally efficient even when generating large images, i.e., does not consume an excessive amount of processing power or memory. Additionally, because the neural network is still attention-based, training of the neural network (and in some cases inference) can be effectively parallelized, reducing the amount of computational resource and time required to train the neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that generates an output image. The output image includes a plurality of pixels arranged in a two-dimensional map, with each pixel having a respective intensity value for each of a plurality of color channels. For example the image can be an RGB image with three color channels per pixel: red, green, and blue.

In particular, the system generates the output image autoregressively over multiple time steps, one intensity value at each time step. To generate the image, the system orders the pixel-color channel pairs in the output image according to a generation order and generates an intensity value for a particular color channel of a particular pixel (particular color channel—particular pixel pair) at each time step conditioned on (i) the intensity values that were already generated from the output image, i.e., intensity values for pairs that precede the particular pair in the generation order and, optionally, (ii) a representation of a conditioning input.

For example, the conditioning input can identify an image class, i.e., object category, to which the generated output image should belong.

As another example, the conditioning input can be a text caption, i.e., a sequence of text describing the contents of an image, and the output image can be an image that is accurately captioned by the text caption.

As another example, the conditioning input can be a lower-resolution image, and the output image can be a higher resolution version of the lower-resolution image.

As another example, the conditioning input can be an image from a source domain, and the output image can be an image from a different, target domain.

Figure 1:
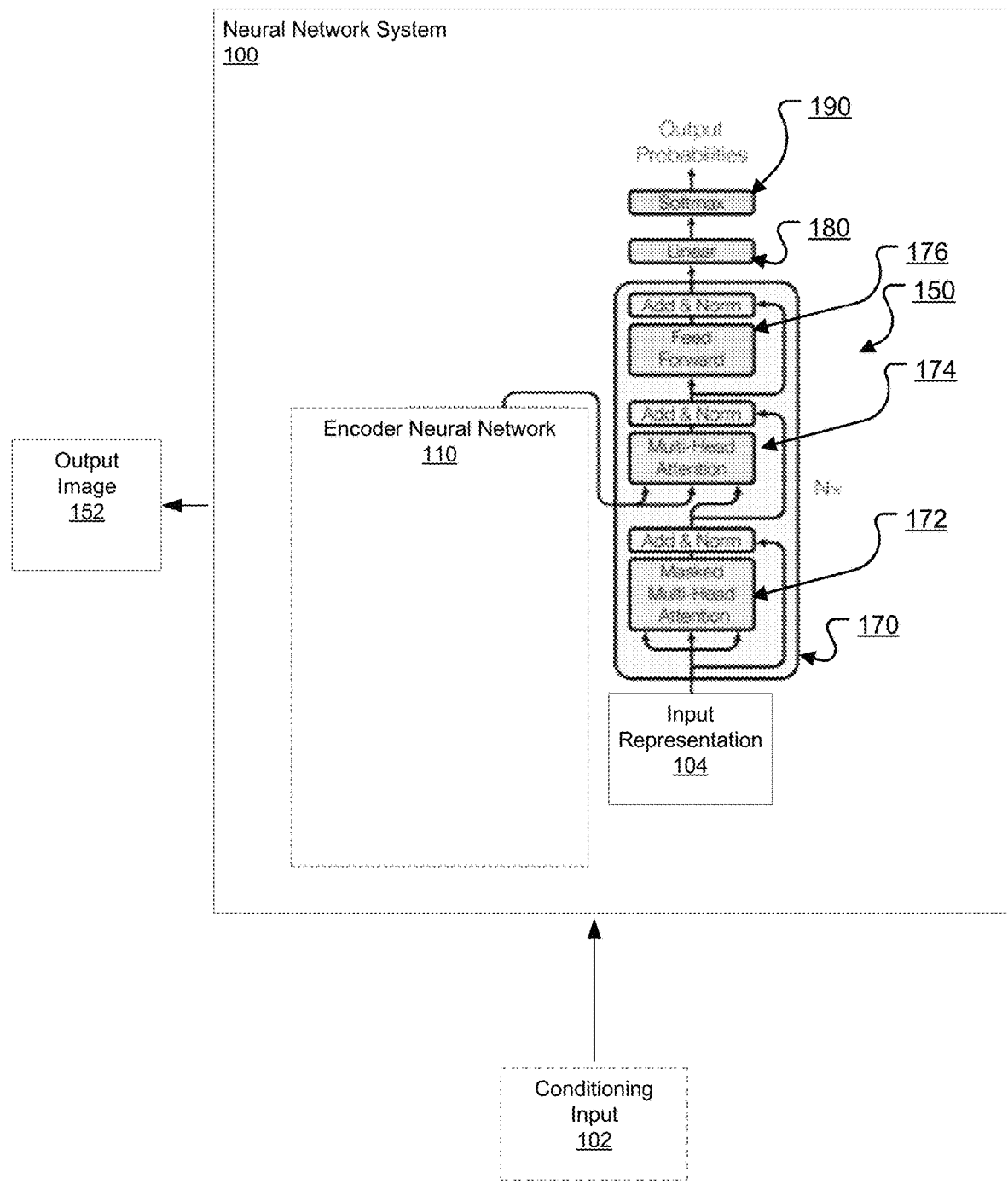
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 generates an output image 152. In some cases, the generation of the output image 152 is unconditional, i.e., the neural network system 100 generates an image that is similar to images seen during training. In some other cases, the generation of the output image is conditioned on a conditioning input 102. Various examples of the conditioning input 102 are described above.

In particular, the neural network system 100 generates the output image autoregressively over multiple time steps, one intensity value at each time step, using a decoder neural network 150. That is, the system generates an intensity value for a particular color channel of a particular pixel (channel-pixel pair or pixel-channel pair) at each time step conditioned on (i) the intensity values that were already generated from the output image and, when used, (ii) a representation of the conditioning input 102. That is, the system 100 orders the pixel-color channel pairs in the output image according to a generation order and then generates the intensity values position by position in the generation order.

At each time step, the neural network system 100 generates a representation 104 of the current output image, i.e., of the intensity values that have already been generated, and processes the representation 104 using the decoder neural network 150 to generate the next intensity value in the output image, i.e., generates the intensity value for the next channel—pixel pair in the generation order.

As will be described in more detail below, in some cases the system 100 also encodes the representation of the conditioning input 102 as part of the representation 104. In some other cases, the system 100 encodes the conditioning input 102 using an encoder neural network 110 to generate a sequential conditioning representation of the conditioning input 102 that includes a respective encoded vector at each input position in the sequential conditioning representation. In these implementations, the decoder neural network 150 also processes the sequential conditioning representation at each time step.

In some implementations, the system 100 generates the representation 104 of the output image by representing each already generated intensity value as a d-dimensional embedding vector. For an image of width w and height h, the system then combines the width and channel dimensions yielding a 3-dimensional input representation tensor with shape [h, w·3, d]. The system 100 can represent the intensities that have not already been generated with placeholder values in the tensor. In some implementations, the embeddings are shared across channels, with the same intensity value receiving the same embedding no matter which color channel it is for. In other implementations, a specific set of embeddings is maintained per channel.

In some other implementations, the system 100 generates the representation 104 of the output image (with placeholder values for intensity values that have not already been generated) by applying a 1×3 window size, 1×3 strided convolution over the output image to combine the 3 channels per pixel to form an input representation tensor with shape [h, w, d].

Once the input representation tensor has been generated, the system 100 adds a d-dimensional encoding of the coordinates of the corresponding pixel-color channel pair in the output image to each spatial position in the input tensor. In some cases, these embeddings are learned during the training of the decoder neural network 150. In other cases, the embeddings can be sine and cosine functions of the coordinates, with different frequencies across different dimension. An example of such functions is:

$$PE_{(pos,2i)}=\sin(pos/10000^{2i/d_{model}})$$

$$PE_{(pos,2i+1)}=\cos(pos/10000^{2i/d_{model}}),$$

where pos is the position, i is the dimension within the positional embedding, and $d_{model}$ is the dimensionality of the positional embedding.

In either case, d/2 of the dimensions of each embedding encode the row number of the channel-pixel pair and the other d/2 of the dimensions encode the column and the specific color channel of the channel-pixel pair. The resulting tensor will be referred to as a position-augmented tensor.

In some implementations, the system 100 uses the position-augmented tensor as the input representation 104. In other implementations, the system 100 adds the representation of the conditioning input 104 to each spatial location in the position-augmented tensor, where the representation of the condition input is also a d-dimensional vector. For example, when the conditioning inputs are image classes, the system can represent the image class as a d-dimensional vector and add that d-dimensional vector to each spatial location in the tensor. As another example, where the conditioning input is caption text, the system can represent the caption text as a d-dimensional vector, e.g., as a bag-of-words embedding or other combination of embeddings of the words in the text.

In implementations where the representation of the conditioning input 104 is not incorporated in the input representation 104, the system 100 also provides the sequential representation of the conditioning input 104 as input to the decoder neural network 150 at each time step.

For a given generation time step, the decoder neural network 150 generates an output that defines a probability distribution over possible intensity values for the channel-pixel pair at the given position in the generation order conditioned on the representation 104 (and, when used, the sequential conditioning representation). The system 100 can then select an intensity value for the channel-pixel pair by sampling from the probability distribution or by selecting the intensity value with the highest probability.

In some implementations, the decoder 150 generates a categorical distribution over possible intensity values, e.g., values 0 through 255. In other implementations, the decoder 150 generates a discretized mixture of logistics (DMOL) distribution over possible intensity values.

Because the decoder neural network 150 is auto-regressive, at each generation time step, the decoder 150 operates on the intensity values that have already been generated before the generation time step, i.e., the intensity values at positions preceding the corresponding position in the generation order. To ensure this is the case during both inference and training, at each generation time step the decoder neural network 150 masks certain operations so that positions can only attend to positions up to and including that position in the generation order (and not subsequent positions).

The decoder neural network 150 includes a sequence of decoder subnetworks 170, a linear layer 180, and a softmax layer 190. In particular, as shown in FIG. 1, the decoder neural network includes N decoder subnetworks 170.

Each decoder subnetwork 170 is configured to, at each generation time step, receive a respective decoder subnetwork input for each of the positions preceding the corresponding position in the generation order and to generate a respective decoder subnetwork output for each of the positions preceding the corresponding position.

In particular, each decoder subnetwork 170 includes at least one kind of attention sub-layer: a decoder self-attention sub-layer 172. When the input to the decoder includes the sequential conditioning representation, each decoder subnetwork 170 also includes an encoder-decoder attention sub-layer 174.

Each decoder self-attention sub-layer 172 is configured to, at each generation time step, receive an input for each particular generation order position preceding the corresponding generation order position and, for each of the particular generation order positions, apply an attention mechanism over the inputs at the generation order positions preceding the corresponding position using one or more queries derived from the input at the particular generation order position to generate a updated representation for the particular generation order position. That is, the decoder self-attention sub-layer 172 applies an attention mechanism that is masked so that it does not attend over or otherwise process any data that is not at a position preceding the current position in the generation order.

Each encoder-decoder attention sub-layer 174, on the other hand, is configured to, at each generation time step, receive an input for each generation order position preceding the corresponding generation order position and, for each of the generation order positions, apply an attention mechanism over the encoded representations at the input positions (in the sequential conditioning representation) using one or more queries derived from the input for the generation order position to generate an updated representation for the generation order position. Thus, the encoder-decoder attention sub-layer 174 applies attention over encoded representations while the decoder self-attention sub-layer 172 applies attention over inputs at generation order positions.

Generally, at least the attention mechanism applied by the decoder self-attention sub-layer 172 applies a local self-attention mechanism in order to account for the potentially large number of intensity values in the representation 104 of the output image.

The attention mechanism applied by each of these attention sub-layers will be described in more detail below with reference to FIGS. 2A and 2B.

In FIG. 1, the decoder self-attention sub-layer 172 is shown as being before the encoder-decoder attention sub-layer in the processing order within the decoder subnetwork 170. In other examples, however, the decoder self-attention sub-layer 172 may be after the encoder-decoder attention sub-layer 174 in the processing order within the decoder subnetwork 170 or different subnetworks may have different processing orders.

In some implementations, each decoder subnetwork 170 includes, after the decoder self-attention sub-layer 172, after the encoder-decoder attention sub-layer 174, or after each of the two sub-layers, a residual connection layer that combines the outputs of the attention sub-layer with the inputs to the attention sub-layer to generate a residual output and a layer normalization layer that applies layer normalization to the residual output. FIG. 1 shows these two layers being inserted after each of the two sub-layers, both referred to as an "Add & Norm" operation.

Some or all of the decoder subnetwork 170 also include a position-wise feed-forward layer 176. In particular, the layer 176 is configured to, at each generation time step: for each generation order position preceding the corresponding generation order position: receive an input at the generation order position, and apply a sequence of transformations to the input at the generation order position to generate an output for the generation order position. For example, the sequence of transformations can include two or more learned linear transformations each separated by an activation function, e.g., a non-linear elementwise activation function, e.g., a ReLU activation function. The inputs received by the position-wise feed-forward layer 176 can be the outputs of the layer normalization layer (following the last attention sub-layer in the subnetwork 170) when the residual and layer normalization layers are included or the outputs of the last attention sub-layer in the subnetwork 170 when the residual and layer normalization layers are not included.

In cases where a decoder subnetwork 170 includes a position-wise feed-forward layer 176, the decoder subnetwork can also include a residual connection layer that combines the outputs of the position-wise feed-forward layer with the inputs to the position-wise feed-forward layer to generate a decoder position-wise residual output and a layer normalization layer that applies layer normalization to the decoder position-wise residual output. These two layers are also collectively referred to as an "Add & Norm" operation in FIG. 1. The outputs of this layer normalization layer can then be used as the outputs of the decoder subnetwork 170.

At each generation time step, the linear layer 180 applies a learned linear transformation to the output of the last decoder subnetwork 170 in order to project the output of the last decoder subnetwork 170 into the appropriate space for processing by the softmax layer 190. The softmax layer 190 then applies a softmax function over the outputs of the linear layer 180 to generate the probability distribution over the possible intensity values at the generation time step. As described above, the system 100 can then select an intensity value from the possible network outputs using the probability distribution.

In some cases, the system 100 employs a tempered softmax instead of a conventional softmax or replaces the linear layer 180 and the softmax 190 with another kind of output layer that generates another appropriate distribution over intensity values.

As described above, in some cases the system 100 uses an encoder neural network 110 to generate the sequence conditioning representation. The encoder neural network 110 can be any appropriate neural network 110 that encodes an input into a sequence of d dimensional vectors. For example, when the conditioning input is an image, the encoder neural network 110 can be a convolutional neural network. As another example, the encoder neural network 110 can be a self-attention-based encoder neural network, akin to the decoder 150 but, since the entire conditioning input 104 is available at the beginning of the processing, with only un-masked self-attention layers. For example, the encoder neural network 110 can represent the input image as a sequence and generate the sequential representation in parallel. When the input image is large, the encoder neural network 110 can employ local attention as described below with respect to the decoder 150.

Figure 2A:
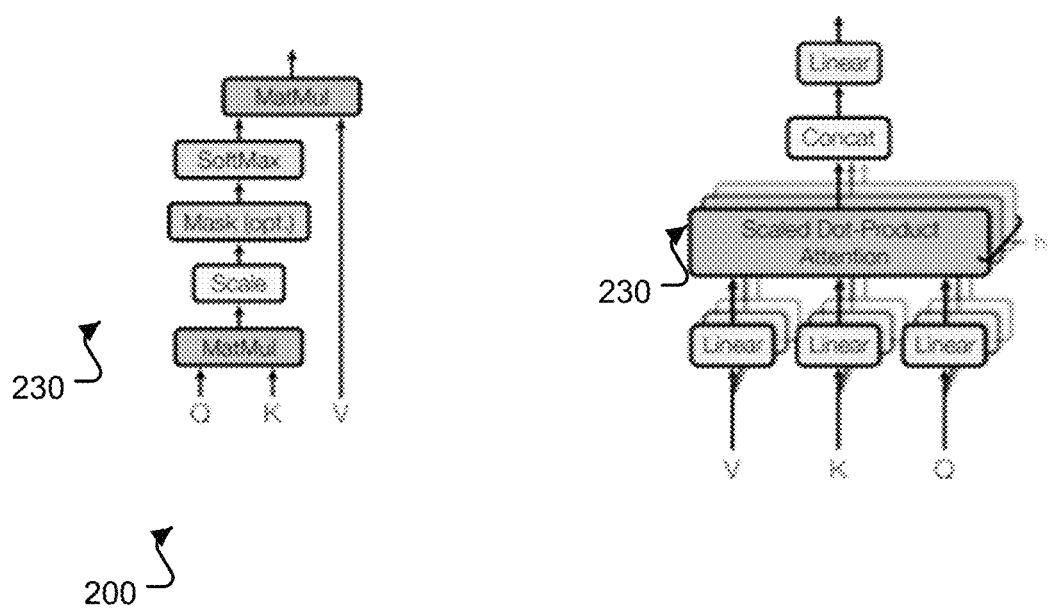
FIG. 2A is a diagram showing attention mechanisms that are applied by the attention sub-layers in the subnetworks of the decoder neural network.

FIG. 2A is a diagram 200 showing attention mechanisms that are applied by the attention sub-layers in the decoder neural network 150.

Generally, an attention mechanism maps a query and a set of key-value pairs to an output, where the query, keys, and values are all vectors. The output is computed as a weighted sum of the values, where the weight assigned to each value is computed by a compatibility function of the query with the corresponding key.

More specifically, each attention sub-layer applies a scaled dot-product attention mechanism 230. In scaled dot-product attention, for a given query, the attention sub-layer computes the dot products of the query with all of the keys, divides each of the dot products by a scaling factor, e.g., by the square root of the dimensions of the queries and keys, and then applies a softmax function over the scaled dot products to obtain the weights on the values. The attention sub-layer then computes a weighted sum of the values in accordance with these weights. Thus, for scaled dot-product attention the compatibility function is the dot product and the output of the compatibility function is further scaled by the scaling factor.

In operation and as shown in the left hand side of FIG. 2A, the attention sub-layer computes the attention over a set of queries simultaneously. In particular, the attention sub-layer packs the queries into a matrix Q, packs the keys into a matrix K, and packs the values into a matrix V. To pack a set of vectors into a matrix, the attention sub-layer can generate a matrix that includes the vectors as the columns of the matrix.

The attention sub-layer then performs a matrix multiply (MatMul) between the matrix Q and the transpose of the matrix K to generate a matrix of compatibility function outputs.

The attention sub-layer then scales the compatibility function output matrix, i.e., by dividing each element of the matrix by the scaling factor.

The attention sub-layer then applies a softmax over the scaled output matrix to generate a matrix of weights and performs a matrix multiply (MatMul) between the weight matrix and the matrix V to generate an output matrix that includes the output of the attention mechanism for each of the values.

For sub-layers that use masking, i.e., decoder attention sub-layers, the attention sub-layer masks the scaled output matrix before applying the softmax. That is, the attention sub-layer masks out (sets to negative infinity), all values in the scaled output matrix that correspond to positions after the current generation order position.

In some implementations, to allow the attention sub-layers to jointly attend to information from different representation subspaces at different positions, the attention sub-layers employ multi-head attention, as illustrated on the right hand side of FIG. 2A.

In particular, to implement multi-ahead attention, the attention sub-layer applies h different attention mechanisms in parallel. In other words, the attention sub-layer includes h different attention layers, with each attention layer within the same attention sub-layer receiving the same original queries Q, original keys K, and original values V.

Each attention layer is configured to transform the original queries, and keys, and values using learned linear transformations and then apply the attention mechanism 230 to the transformed queries, keys, and values. Each attention layer will generally learn different transformations from each other attention layer in the same attention sub-layer.

In particular, each attention layer is configured to apply a learned query linear transformation to each original query to generate a layer-specific query for each original query, apply a learned key linear transformation to each original key to generate a layer-specific key for each original key, and apply a learned value linear transformation to each original value to generate a layer-specific values for each original value. The attention layer then applies the attention mechanism described above using these layer-specific queries, keys, and values to generate initial outputs for the attention layer.

The attention sub-layer then combines the initial outputs of the attention layers to generate the final output of the attention sub-layer. As shown in FIG. 2A, the attention sub-layer concatenates (concat) the outputs of the attention layers and applies a learned linear transformation to the concatenated output to generate the output of the attention sub-layer.

In some cases, the learned transformations applied by the attention sub-layer reduce the dimensionality of the original keys and values and, optionally, the queries. For example, when the dimensionality of the original keys, values, and queries is d and there are h attention layers in the sub-layer, the sub-layer may reduce the dimensionality of the original keys, values, and queries to d/h. This keeps the computation cost of the multi-head attention mechanism similar to what the cost would have been to perform the attention mechanism once with full dimensionality while at the same time increasing the representative capacity of the attention sub-layer.

While the attention mechanism applied by each attention sub-layer is the same, the queries, keys, and values are different for different types of attention. That is, different types of attention sub-layers use different sources for the original queries, keys, and values that are received as input by the attention sub-layer.

When the attention sub-layer is a decoder self-attention sub-layer, each position in the decoder attends to all positions in the decoder preceding that position. Thus, all of the keys, values, and queries come from the same place, in this case, the output of the previous subnetwork in the decoder, or, for the decoder self-attention sub-layer in the first decoder subnetwork, the embeddings in the representation 104. Thus, there is a respective key, value, and query for each position in the generation order before the current position.

When the attention sub-layer is an encoder-decoder attention sub-layer, the queries come from the previous component in the decoder and the keys and values come from the output of the encoder, i.e., from the encoded representations generated by the encoder. This allows every position in the decoder to attend over all positions in the input sequence. Thus, there is a respective query for each for each position in the generation order before the current position and a respective key and a respective value for each position in the sequential conditioning representation.

In more detail, when the attention sub-layer is a decoder self-attention sub-layer, the decoder self-attention sub-layer is configured to, at each generation time step: receive an input for each generation order position preceding the corresponding generation order position and, for each of the particular generation order positions, apply an attention mechanism over the inputs at the generation order positions preceding the corresponding position using one or more queries derived from the input at the particular generation order position to generate a updated representation for the particular generation order position.

When the decoder self-attention sub-layer implements multi-head attention, each attention layer in the decoder self-attention sub-layer is configured to, at each generation time step, apply a learned query linear transformation to the input at each generation order position preceding the corresponding generation order position to generate a respective query for each generation order position, apply a learned key linear transformation to each input at each generation order position preceding the corresponding generation order position to generate a respective key for each generation order position, apply a learned value linear transformation to each input at each generation order position preceding the corresponding generation order position to generate a respective key for each generation order position, and then apply the attention mechanism (i.e., the scaled dot-product attention mechanism described above) using the queries, keys, and values to determine an initial decoder self-attention output for each of the generation order positions. The sub-layer then combines the initial outputs of the attention layers as described above.

When the attention sub-layer is an encoder-decoder attention sub-layer, the encoder-decoder attention sub-layer is configured to, at each generation time step: receive an input for each generation order position preceding the corresponding generation order position and, for each of the generation order positions, apply an attention mechanism over the encoded representations at the input positions using one or more queries derived from the input for the generation order position to generate an updated representation for the generation order position.

When the encoder-decoder attention sub-layer implements multi-head attention, each attention layer is configured to, at each generation time step: apply a learned query linear transformation to the input at each generation order position preceding the corresponding generation order position to generate a respective query for each generation order position, apply a learned key linear transformation to each encoded representation at each input position to generate a respective key for each input position, apply a learned value linear transformation to each encoded representation at each input position to generate a respective value for each input position, and then apply the attention mechanism (i.e., the scaled dot-product attention mechanism described above) using the queries, keys, and values to determine an initial encoder-decoder attention output for each input position. The sub-layer then combines the initial outputs of the attention layers as described above.

However, to account for the possibly large number of intensity values in the current representation, at least the decoder self-attention layers implement masked local self-attention. In masked local self-attention, the number of positions a given position attends to is fixed, i.e., so that not all of the positions attend to all previous positions.

In particular, a local self-attention mechanism performs the same operations described above, except that the number of previous positions that the mechanism attends over for a given position is constrained. In other words, the number of columns in the matrices K and V is fixed to a number that is less than the number of intensity values.

More specifically, the self-attention layer (or, more generally, the system) divides the output image into a plurality of non-overlapping query blocks that each include multiple pixel-color channel pairs. Each query block is associated with a memory block that includes the query block and multiple pixel-color channel pairs that are generated at time steps before the pixel-color channel pairs in the query block, i.e., that are before the query block in the generation order. The memory block may also include additional pixel-color channel pairs that are after the query block in the generation order. Each pixel-color channel pair in a query block is associated with the same memory block, i.e., so that the memory block is the same for multiple pixel—color channel pairs and is constant for processing of the entire query block.

The local self-attention mechanism performs the operations described above, except that for each pixel-color channel pair, the self-attention mechanism attends only to the pixel-color channel pairs in the memory block for the query block to which the pair belongs. Within a query block, the attention mechanism is masked as described above to prevent attending to any future, not-yet-generated pixel-color channel pairs in the query block and the memory block.

Example techniques for dividing a representation into query blocks and memory blocks are described below with reference to FIG. 2B.

Figure 2B:
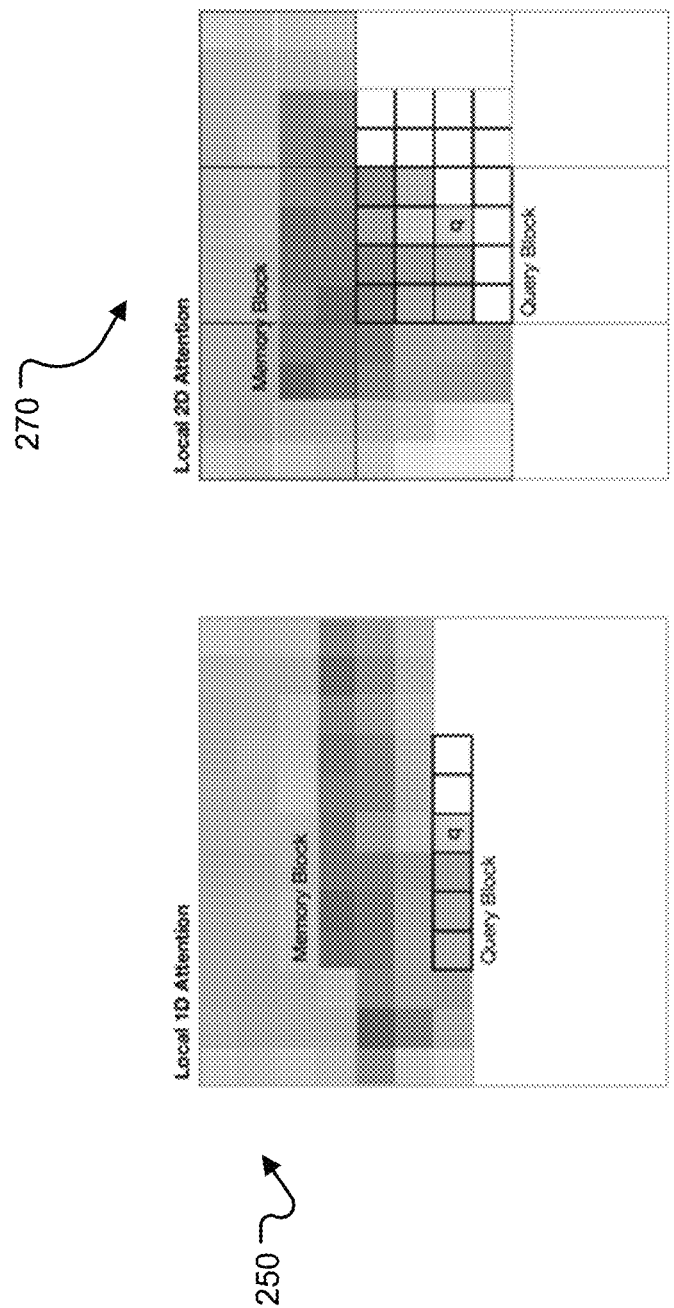
FIG. 2B illustrates a local 1D attention scheme and a local 2D attention scheme.

FIG. 2B illustrates a local 1D attention scheme 250 and a local 2D attention scheme 270.

Both schemes 250 and 270 show a partially generated output image (i.e., the "current output image" as of some particular position in the generation order), with "q" denoting the last pixel that was generated. That is, in the example of FIG. 2B, the last intensity value to have been generated is the intensity value for the B channel of the pixel q and the current intensity to be generated is the channel R for the pixel to the right of the pixel q in the image.

For local 1D attention 250, the system flattens the input tensor in raster-scan order to generate a linearized image. The system then partitions the length of the linearized image into non-overlapping query blocks of a fixed length, padding with zeroes if necessary. For each query block, the system assigns as the memory block M (i) the positions within the query block and (ii) an additional l positions corresponding to pixel-color channel pairs that have been generated before, i.e., that are before the query block in the raster-scan order. Thus, as can be seen in the example 250, the memory block for the depicted query block includes the pixel-color channel pairs from a fixed number of pixels before the query block in raster scan order within the image.

For local 2D attention 270, the system partitions the representation into rectangular query blocks contiguous in the original image space. The output image is then generated one query block after another, ordering the blocks in raster-scan order. Within each block, the layer generates individual positions, or pixel channels, again in raster-scan order. As illustrated in the scheme 270, the layer generates the blocks outlined in grey lines left-to-right and top-to-bottom.

In particular, each query block is a 2-dimensional query block of a size 1 q specified by height and width 1 q=wq hq and the corresponding memory block extends the query block to the top, left and right by hm, wm and again wm pixels, respectively. Thus, the memory block for each query block extends the query block one or more pixels to the top in the image, to the left in the image, and to the right in the image.

Each attention layer within the decoder neural network uses the same local attention scheme, i.e., either 1D or 2D attention.

Thus, as can be seen from the examples in FIG. 2B, the manner in which the system generates the query blocks determines the generation order for the pixel-color channel pairs in the image. In particular, the query blocks are ordered and the generation order proceeds query block by query block, i.e., with all of the pairs in each query block being generated before any pairs in query blocks after the query block in the query block order are generated.

Figure 3:
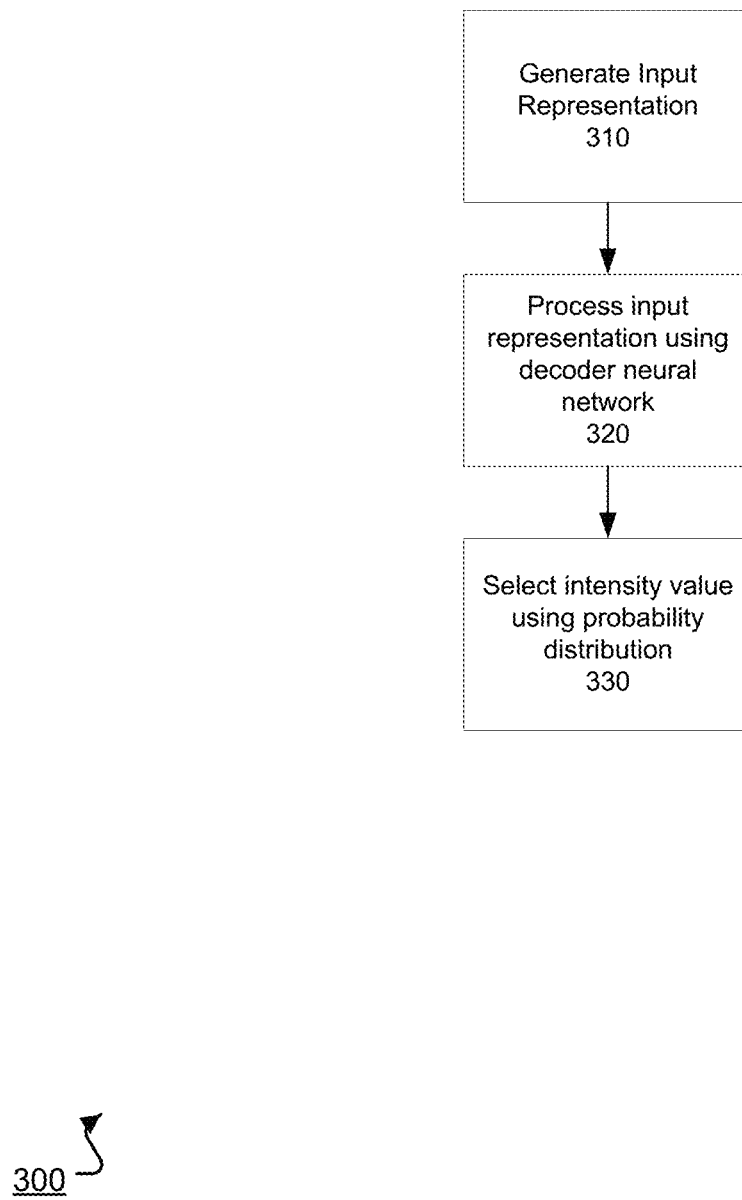
FIG. 3 is a flow diagram of an example process for generating an output image.

FIG. 3 is a flow diagram of an example process 300 for generating an output image. For convenience, the process 300 will be described as being performed by a system of one or more computers located in one or more locations. For example, a neural network system, e.g., neural network system 100 of FIG. 1, appropriately programmed in accordance with this specification, can perform the process 300.

The system can perform the process 300 at each of multiple generation time steps to generate an output image, with each position corresponding in the generation order of the output image. In other words, the system performs the process 300 for each position in the generation order.

The system generates a representation of a current output image that includes intensity values for pixel-channel pairs that are before the current position in the generation order, i.e., that includes the already generated intensity values in the generation order (step 310).

The system processes the generated representation using the decoder neural network to generate a probability distribution over possible intensity values (step 320). The decoder neural network is configured to processes the representation (and, in some cases, the sequential conditioning representation) through the sequence of decoder subnetworks, the linear layer, and the softmax layer to generate the given output. At each decoder subnetwork, a decoder self-attention sub-layer performs local self-attention on the inputs to the decoder self-attention sub-layer that are at positions preceding the current position in the generation order. When the sequential conditioning representation is included as input, at each subnetwork an encoder-decoder sub-layer attends over the representations at input positions in the sequential conditioning representation.

The system selects an intensity value from the probability distribution as the intensity value for the pixel-channel pair in the output image (step 330), e.g., by sampling from the distribution or selecting the intensity value with the highest probability. The decoder neural network is configured to generate the output sequence from the encoded representations in an auto-regressive manner. That is, the decoder neural network generates one output from the output sequence at each generation time step. At a given generation time step at which a given output is being generated, the system processes the outputs before the given output in the output sequence through the embedding layer in the decoder to generate embedded representations. The system then processes the embedded representations through the sequence of decoder subnetworks, the linear layer, and the softmax layer to generate the given output. Because the decoder subnetworks include encoder-decoder attention sub-layers as well as decoder self-attention sub-layers, the decoder makes use of both the already generated outputs and the encoded representations when generating the given output.

The system can perform the process 300 after training, i.e., when the output image that should be generated by the system, is not known and final values of the parameters of the decoder neural network have already been determined.

The system can also repeatedly perform the process 300 on output images in a set of training data, i.e., a set of known output images that should be generated by the system, in order to train the decoder and, optionally, the encoder to determine trained values for the parameters of the encoder and decoder. During training however, because the output image to be generated is known before the system begins processing, the system can perform the generation in parallel for all of the pairs in the generation order. That is, the system can perform a single forward pass through the decoder to generate a respective distribution for each intensity value in the image by setting the representation for the single forward pass to be a representation of the entire known output image. The system can then update the parameters of the decoder (and optionally the encoder) as part of a conventional machine learning training technique, e.g., a gradient descent with backpropagation training technique that uses a conventional optimizer, e.g., the Adam optimizer. During training, the system can incorporate any number of techniques to improve the speed, the effectiveness, or both of the training process. For example, the system can use dropout, batch normalization, or both to reduce overfitting. As another example, the system can perform the training using a distributed architecture that trains multiple instances of the decoder in parallel.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations.

Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of auto-regressively generating an output image, the output image comprising a plurality of pixels arranged in a two-dimensional map, each pixel having a respective color value for each of a plurality of color channels, and the method comprising, for a particular generation order position in a generation order of pixel—color channel pairs from the output image:
generating a current output image representation of a current output image, wherein the pixel—color channel pairs in the output image are divided into query blocks each comprising a plurality of pixel—color channel pairs, wherein each query block is associated with a respective memory block that includes the pixel—color channel pairs in the query block and a plurality of additional pixel—color channel pairs, and wherein the current output image includes already generated intensity values for pixel—color channel pairs that are (i) at generation order positions before the particular generation order position in the generation order and (ii) in a memory block that is associated with a query block that includes the pixel—color channel pair at the particular generation order position;
processing the current output image representation using a decoder neural network to generate a probability distribution over possible intensity values for the pixel—color channel pair at the particular generation order position, wherein the decoder neural network comprises a sequence of decoder subnetworks, each decoder subnetwork comprising a decoder self-attention sub-layer that is configured to, for the particular generation order position:
receive an input for each pixel—color channel pair that is (i) at a generation order position before the particular generation order position in the generation order and (ii) that is in a memory block that is associated with a query block that includes the pixel—color channel pair at the particular generation order position; and
apply a masked attention mechanism only over the received inputs using one or more queries derived from an input corresponding to the particular generation order position to generate an updated representation corresponding to the particular generation order position; and
selecting an intensity value for the pixel—color channel pair at the particular generation order position using the probability distribution.

2. The method of claim 1, wherein the generating of the output image is conditioned on a conditioning input, and wherein generating a current output image representation of a current output image comprises:
augmenting the current output image representation with a representation of the conditioning input.

3. The method of claim 1, wherein the generating of the output image is conditioned on a conditioning input, and wherein generating a current output image representation of a current output image comprises:
processing the conditioning input using an encoder neural network to generate a sequential conditioning representation comprising a respective encoded vector at each of a plurality of conditioning representation positions; and
wherein processing the current output image representation using the decoder neural network comprises processing the current output image representation and the sequential conditioning representation using the decoder neural network.

4. The method of claim 1, wherein the query blocks are ordered according to a query block order, and wherein the generation output order specifies that the intensity values are generated query block by query block according to the query block order.

5. The method of claim 1, wherein positions in the memory block corresponding to pixel—color channel pairs that have not yet been generated are masked off when applying the masked attention mechanism.

6. The method of claim 1, wherein each decoder self-attention sub-layer comprises a plurality of decoder self-attention layers, and wherein each decoder self-attention layer is configured to, for the particular generation order position:
apply a learned query linear transformation to the input corresponding to the particular generation order position to generate a respective query for the particular generation order position,
apply a learned key linear transformation to each input at each generation order position in the memory block to generate a respective key for each generation order position,
apply a learned value linear transformation to each input at each generation order position in the memory block to generate a respective key for each generation order position,
determine a respective output-position specific weight for each of the generation order positions in the memory by applying a comparison function between the query for the particular generation order position and the keys, and
determine an initial decoder attention output for the particular generation order position by determining a weighted sum of the values weighted by the corresponding output-position specific weights for the particular generation order position.

7. The method of claim 1, wherein generating a current output image representation of a current output image comprises:
representing each already generated intensity value as a d-dimensional embedding vector; and
combining width and channel dimensions to generate a 3-dimensional input representation tensor with shape [h, w ·3, d], where h is the height of the output image and w is the width of the output image.

8. The method of claim 1, wherein generating a representation of a current output image comprises:
applying a 1x3 window size, 1x3 strided convolution over the current output image to generate an input representation tensor with shape [h, w, d], where h is the height of the output image and w is the width of the output image, and d is a fixed integer greater than one.

9. The method of claim 3, wherein each decoder subnetwork comprises:
an encoder-decoder attention sub-layer that is configured to, for the particular generation order position:
receive an input for each pixel—color channel pair that is (i) at a generation order position before the particular generation order position in the generation order and (ii) that is in a memory block that is associated with a query block that includes the pixel—color channel pair at the particular generation order position, and p2 apply an attention mechanism over the encoded vectors at the conditioning representation positions using one or more queries derived from an input corresponding to the particular generation order position to generate an updated representation corresponding to the particular generation order position.

10. The method of claim 6, wherein the decoder self-attention sub-layer is configured to combine the decoder attention outputs generated by the decoder layers to generate the output for the decoder attention sub-layer for the particular generation order position.

11. The method of claim 9, wherein each encoder-decoder attention sub-layer comprises a plurality of encoder-decoder attention layers, and wherein each encoder-decoder attention layer is configured to, for the particular generation order position:
apply a learned query linear transformation to the input at each generation order position preceding the particular generation order position to generate a respective query for each generation order position,
apply a learned key linear transformation to each encoded representation at each conditioning position to generate a respective key for each input position,
apply a learned value linear transformation to each encoded representation at each conditioning position to generate a respective value for each input position, and
for each generation order position preceding the particular generation order position,
determine a respective output-position specific weight for each of the conditioning positions by applying a comparison function between the query for the generation order position and the keys, and
determine an initial encoder-decoder attention output for the generation order position by determining a weighted sum of the values weighted by the corresponding output-position specific weights for the conditioning position.

12. The method of claim 11, wherein the encoder-decoder attention sub-layer is configured to, at each generation time step, combine the encoder-decoder attention outputs generated by the encoder-decoder layers to generate the output for the encoder-decoder attention sub-layer.

13. A system comprising one or more computers and one or more storage devices storing instructions that when executed by the one or more computers cause the one or more computers to perform operations for auto-regressively generating an output image, the output image comprising a plurality of pixels arranged in a two-dimensional map, each pixel having a respective color value for each of a plurality of color channels, and the operations comprising, for a particular generation order position in a generation order of pixel—color channel pairs from the output image:
generating a current output image representation of a current output image, wherein the pixel—color channel pairs in the output image are divided into query blocks each comprising a plurality of pixel—color channel pairs, wherein each query block is associated with a respective memory block that includes the pixel—color channel pairs in the query block and a plurality of additional pixel—color channel pairs, and wherein the current output image includes already generated intensity values for pixel—color channel pairs that are (i) at generation order positions before the particular generation order position in the generation order and (ii) in a memory block that is associated with a query block that includes the pixel—color channel pair at the particular generation order position;
processing the current output image representation using a decoder neural network to generate a probability distribution over possible intensity values for the pixel—color channel pair at the particular generation order position, wherein the decoder neural network comprises a sequence of decoder subnetworks, each decoder subnetwork comprising a decoder self-attention sub-layer that is configured to, for the particular generation order position:
receive an input for each pixel—color channel pair that is (i) at a generation order positions before the particular generation order position in the generation order and (ii) in a memory block that is associated with a query block that includes the pixel—color channel pair at the particular generation order position; and
apply a masked attention mechanism only over the received inputs using one or more queries derived from an input corresponding to the particular generation order position to generate an updated representation corresponding to the particular generation order position; and
selecting an intensity value for the pixel—color channel pair at the particular generation order position using the probability distribution.

14. The system of claim 13, wherein the generating of the output image is conditioned on a conditioning input, and wherein generating a current output image representation of a current output image comprises:
augmenting the current output image representation with a representation of the conditioning input.

15. The system of claim 13, wherein the generating of the output image is conditioned on a conditioning input, and wherein generating a current output image representation of a current output image comprises:
processing the conditioning input using an encoder neural network to generate a sequential conditioning representation comprising a respective encoded vector at each of a plurality of conditioning representation positions; and
wherein processing the current output image representation using the decoder neural network comprises processing the current output image representation and the sequential conditioning representation using the decoder neural network.

16. The system of claim 13, wherein the query blocks are ordered according to a query block order, and wherein the generation output order specifies that the intensity values are generated query block by query block according to the query block order.

17. The system of claim 13, wherein positions in the memory block corresponding to pixel—color channel pairs that have not yet been generated are masked off when applying the masked attention mechanism.

18. The system of claim 13, wherein each decoder local self-attention sub-layer comprises a plurality of decoder self-attention layers, and wherein each decoder self-attention layer is configured to, for the particular generation order position:

apply a learned query linear transformation to the input corresponding to the particular generation order position in the memory block to generate a respective query for each generation order position, apply a learned key linear transformation to each input at each generation order position in the memory block to generate a respective key for each generation order position, apply a learned value linear transformation to each input at each generation order position in the memory block to generate a respective key for each generation order position, determine a respective output-position specific weight for each of the generation order positions by applying a comparison function between the query for the particular generation order position and the keys, and determine an initial decoder attention output corresponding to the particular generation order position by determining a weighted sum of the values weighted by the corresponding output-position specific weights for the particular generation order position.

19. The system of claim 13, wherein generating a current output image representation of a current output image comprises:

representing each already generated intensity value as a d-dimensional embedding vector; and combining width and channel dimensions to generate a 3-dimensional input representation tensor with shape [h, w ·3, d], where h is the height of the output image and w is the width of the output image.

20. The system of claim 13, wherein generating a representation of a current output image comprises:

applying a 1x3window size, 1x3strided convolution over the current output image to generate an input representation tensor with shape [h, w, d], where h is the height of the output image and w is the width of the output image, and d is a fixed integer greater than one.

21. The system of claim 18, wherein the decoder self-attention sub-layer is configured to combine the decoder attention outputs generated by the decoder layers to generate the output for the decoder attention sub-layer corresponding to the particular generation order position.

22. One or more non-transitory computer-readable storage media storing instructions that when executed by one or more computers cause the one or more computers to perform operations for auto-regressively generating an output image, the output image comprising a plurality of pixels arranged in a two-dimensional map, each pixel having a respective color value for each of a plurality of color channels, and the operations comprising, for a particular generation order position in a generation order of pixel—color channel pairs from the output image:

generating a current output image representation of a current output image, wherein the pixel—color channel pairs in the output image are divided into query blocks each comprising a plurality of pixel—color channel pairs, wherein each query block is associated with a respective memory block that includes the pixel—color channel pairs in the query block and a plurality of additional pixel—color channel pairs, and wherein the current output image includes already generated intensity values for pixel—color channel pairs that are (i) at generation order positions before the particular generation order position in the generation order and (ii) in a memory block that is associated with a query block that includes the pixel—color channel pair at the particular generation order position;

processing the current output image representation using a decoder neural network to generate a probability distribution over possible intensity values for the pixel—color channel pair at the particular generation order position, wherein the decoder neural network comprises a sequence of decoder subnetworks, each decoder subnetwork comprising a decoder self-attention sub-layer that is configured to, for the particular generation order position:

receive an input for each pixel—color channel pair that is (i) at a generation order positions before the particular generation order position in the generation order and (ii) in a memory block that is associated with a query block that includes the pixel—color channel pair at the particular generation order position:; and apply a masked attention mechanism only over the received inputs using one or more queries derived from an input corresponding to the particular generation order position to generate an updated representation corresponding to the particular generation order position; and selecting an intensity value for the pixel—color channel pair at the particular generation order position using the probability distribution.

* * * * *